May 8, 1945.  H. C. BLANKMEYER ET AL  2,375,189
CONVERSION PROCESS
Filed Sept. 9, 1941
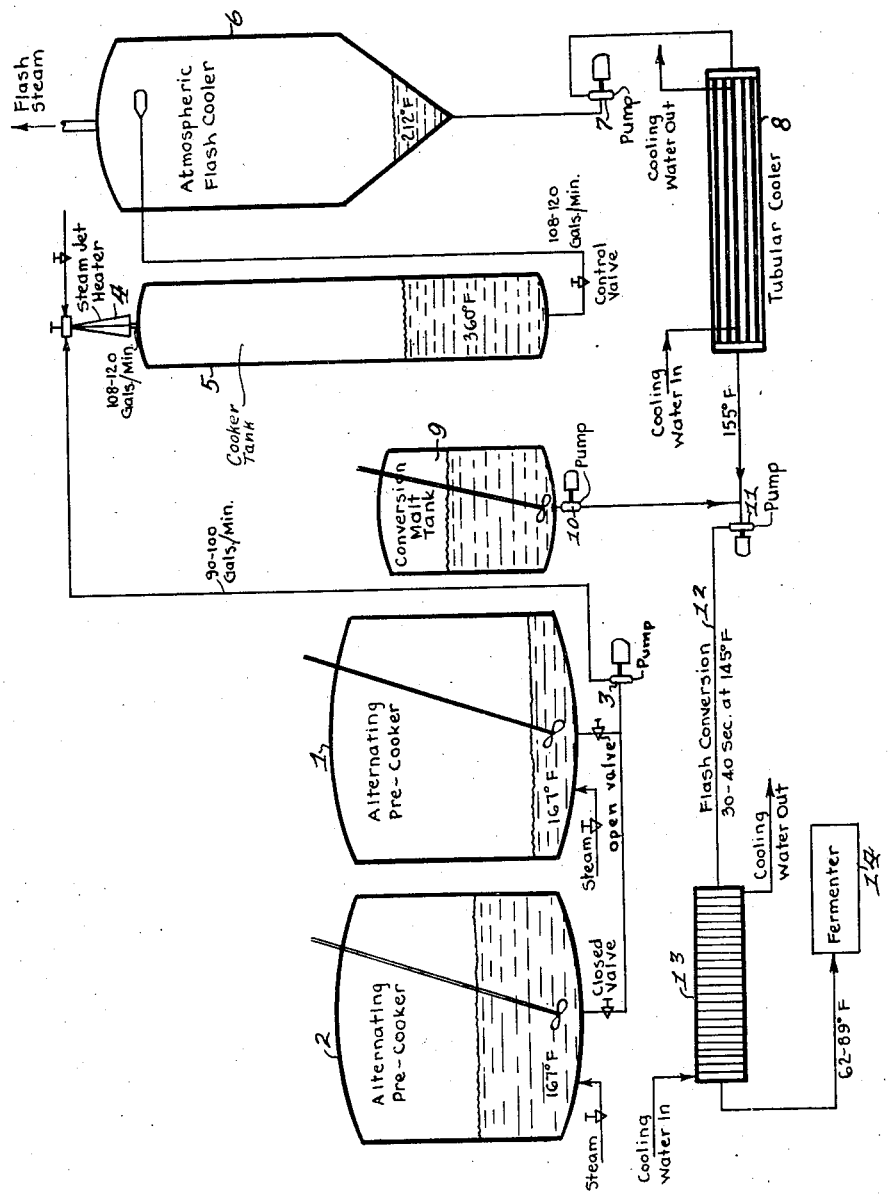
HARRISON C. BLANKMEYER.
WILLIAM H. STARK.
INVENTORS
BY Arthur H. Robert
ATTORNEY

Patented May 8, 1945

2,375,189

UNITED STATES PATENT OFFICE 2,375,189

CONVERSION PROCESS

Harrison C. Blankmeyer, Lawrenceburg, Ind., and William H. Stark, Louisville, Ky., assignors to Joseph E. Seagrams & Sons, Inc., Shively, Ky., a corporation of Indiana Application September 9, 1941, Serial No. 410,218

9 Claims. (Cl. 195—103)

The plant practice presently employed in processing corn to produce a fermentable mash comprises: preparing a malt slurry (100° F.) by mixing barley or like malts with water (approx. ratio 1 bu./30-50 gals.); preparing a mash slurry (120-130° F.) by mixing ground corn with water (approx. ratio 1 bu./18-22 gals.); adjusting the pH of the mash slurry so that during subsequent conversion it will be within the optimum range of 5.4 to 5.6; cooking the mash by heating it (30-45 mins. with steam at 60-65 #s press.) to a temperature approximating 308° F., at which it is held (5-10 mins.) to insure complete gelatinization of the starch; cooling the cooked mash to the conversion temperature (152° F.), first by gradually relieving the steam pressure over a suitable period of time (30-40 mins.) until the temperature drops to 220° F., and finally applying vacuum (30-45 mins.); until temperature drops to 152° F.; converting the cooled mash by mixing it with the malt slurry (100° F.) and agitating the mixture (45-120 mins.) at a normal conversion temperature (145° F.) until the conversion is completed; cooling the converted mash to the normal alcoholic-yeast fermenting temperature range (62-86° F.); and directing it to the fermenters. The normal alcoholic-yeast fermenting temperature range designates, of course, the temperature range normally employed in alcoholic-yeast fermentation that is to say the alcoholic fermentation of yeast.

Variations in the cooking step are disclosed in Patent #2,222,306 and the co-pending application of Blankmeyer and Unger, Serial #403,178 wherein it is proposed to pre-cook the mash at an intermediate or pre-cooking temperature (160° F.) to stabilize its liquidity and thereafter finally cook it at a substantially elevated temperature (325-390° F.). The present invention is directed to an improvement in the conversion step.

The principal object of the present invention is to provide an improved conversion operation which decreases the cost, and increases the yield, of alcohol which may be advantageously performed continuously, and which insures uniformity in the fermentable materials produced.

The purpose of the conversion operation is to change the gelatinized carbohydrates (starches and dextrins) to fermentable maltose (sugar). Since the fermentable sugar has a much lower viscosity than the gelatinous starches and dextrins, this change is accompanied by a corresponding decrease in viscosity. The conversion procedure employed prior to this invention was designed to effect as complete a conversion as is possible. As indicated, a long time (1 to 2 hrs.) is required to complete it and, when it is completed, the sugar content of the mash constitutes 80% or more of the total carbohydrates present. With this large sugar content, the mash is, and remains, free flowing and pumpable at the conversion and the fermentation temperatures. Obviously, a reduction in the normal conversion time will necessarily result in the production of less sugar and, with less sugar, there is every reason to expect a corresponding increase in viscosity and decrease in the yield of alcohol. One aspect of our invention has to do with the discovery that the time for conversion of the mash may be reduced substantially below the 45 mins. heretofore used without causing any decrease in the alcohol yield per bushel of grain. Such a reduction in conversion time permits a marked improvement in operating efficiency and a saving in operating cost.

A second and even more important aspect of the present invention resides in the discovery that contrary to expectations the yield of alcohol may be increased when the conversion time is sufficiently shortened. While a sufficient reduction in the time required for conversion results in the production of less sugar, we have found: that a substantial amount of sugar (60-75%) is produced within a reaction time ranging from several seconds to a few minutes; that this amount of sugar is amply sufficient not only to render the mash free flowing at the conversion and fermentation temperatures, but to support subsequent fermentation; and that, during subsequent fermentation, the final conversion proceeds to a completion while the yield of alcohol is substantially increased.

Although the reason for the increased yield of alcohol has not been unmistakably determined, it is believed that the reduction in time results in a very substantial reduction in the destruction of amylase, and that the amylase thus preserved functions, during subsequent fermentation, to convert residual dextrins to such a degree as to produce more complete conversion and fermentation than has heretofore been possible with a consequent increase in the yield of alcohol. It has also been suggested that this reduction in time may result in a decreased destruction of the heat labile factors which promote the growth and fermentation of yeast. This possibility may account, in part at least, for the increased yield of alcohol. Whatever may occur, the conversion power of the malt is substantially preserved.

A continuous system capable of practicing the invention is illustrated in the drawing.

In carrying out the invention, the mash slurry may be prepared and cooked in accordance with present plant practice or it may be pre-cooked and finally cooked in the manner set forth in either Patent #2,222,306 or the aforesaid co-pending application of Blankmeyer and Unger. While the pH of the mash slurry may be adjusted so that during subsequent conversion it will be within the range of 5.4 to 5.6, better results appear to be obtained when the adjustment produces a conversion pH of 5.8. Regardless of the manner in which the mash slurry is prepared and cooked, it should be cooled to the proper temperature (152° F.) after the final cooking operation.

The malt slurry may likewise be prepared in the usual way by mixing the proper amount of ground malted grain (approx. 10% of the total grain) with water at the proper temperature (100° F.). If desired, the temperature of the malt slurry may be raised to 130° F.

The malt slurry is added to the cooked mash to produce a mixture of the normal conversion temperature (145° F.) and, during or after the addition, the mixture vigorously agitated to insure intimate admixture. It has been found in accordance with the present invention that a reduction in the conversion time to 10 or 15 mins. has substantially no effect on the yield of alcohol. When the mix is held at a normal conversion temperature for less than about 10 or 15 mins. the yield of alcohol increases apparently progressively until a maximum yield of alcohol is obtained from the fermented material. When the mix is only subjected to flash conversion, that is held at a suitable conversion temperature for a few seconds up to about 5 mins. or so, the most outstanding and desirable results of the present invention are obtained. During this time, a large portion of the total carbohydrates are converted, even as much as 60 to 75% in most instances; and an effective amount of the amylase content of the mash is retained for future conversion in the fermenter. The increased yield of alcohol under such conditions is usually about 0.1 gal. per bushel of grain.

The time preferred for conversion of the mash depends of course upon the particular mash involved and the intimacy of the mixture. It is about the minimum time required to produce a workable mix, which is a mix having sufficient of the starch converted to reduce its viscosity to a degree such that it is free flowing or pumpable at normal or fermentation temperatures. Such a mix may be said to contain a workable quantity of sugar, and will adequately support fermentation.

The partially converted material should be cooled rapidly and, if desired, instantaneously, to the normal alcoholic-yeast fermenting temperature range (62–89° F.), and then directed into the fermenters. Since the conversion temperature will in time destroy the amylase content of the mash the length of time at which it is held at such temperature should be minimized, while the rate at which it is cooled to the fermenting temperature range should be maximized in order to obtain the maximum benefit from the process.

A reduction, of the order indicated, in the normal conversion time makes the continuous performance of the conversion operation economically feasible and desirable, because it requires less equipment and involves substantially less operating cost. To illustrate representative time and temperature factors involved in its continuous performance, reference is now made to the system shown in the drawing which combines the semi-continuous cooking system disclosed in the aforesaid co-pending application with a continuous conversion system.

The semi-continuous system which cooks the mash and then cools it to a temperature of 155° F. operates as follows: (a) a mash composed of 4437 gals. of water at 140° F., 800 gals. of stillage at 90° F., 12,338 lbs. of cornmeal and 185 lbs. of barley malt in 115 gals. of water at 90–100° F.— is prepared and pre-cooked in the pre-cooker 1 (or 2) at 167° F.; (b) the pre-cooked mash is pumped by pump 3 from the pre-cooker at a rate of 90–100 gals. per min.; (c) the stream of pre-cooked mash is continuously cooked by passing it through a steam injector 4 and a cooker tank 5, the injector operating to heat the mash instantaneously to a cooking temperature (approx. 360° F.) sufficient to gelatinize substantially all of its starch content and the cooker tank operating, if gelatinization is not complete, to complete it by holding the mash at the cooking temperature for a short interval; (d) the cooked mash is continuously pumped from the cooker tank at a rate (108–120 gals. per min.) sufficient to maintain a level in the cooker vessel at 4.5–5.0 ft., this rate being higher than that of the pre-cooked mash due to the condensation of injected steam; (e) the stream of cooked mash is continuously flash cooled to 212° F. in the atmospheric flash cooler 6; (f) the cooled mash is pumped from the flash cooler at a rate sufficient to maintain a 2 ft. level in the cooler; and (g) the cooled mash is further cooled to a lower temperature (approx. 155° F.) by forcing it with pump 7 through a tubular cooler 8. These steps, of course, form no part of the present invention, but condition the mash for mixture with the malt slurry.

While the malt slurry may be prepared in a continuous manner, in the system illustrated, it is prepared as a batch in the conversion-malt tank 9. The malt slurry is composed of 2476 gals. of water at 68–72° F. and 3948 lbs. of barley malt. A pump 10 may be used to draw it from the malt tank and feed it to the cooked and cooled corn mash at the rate required to give the proper ratio of corn to malt. Since this ratio is 8 lbs. of conversion malt for each 100 lbs. of corn, the malt slurry should be fed at a rate approximating 10–11 gals. per min. The quantity of malt mash thus prepared is sufficient for a 1000 bu. fermenter.

The pump 11 effects a thorough mixture of malt and mash more or less instantaneously. When mixed, this mash attains the normal conversion temperature (145° F.). This mixture is subjected to preliminary flash conversion to produce a "workable" quantity of sugar by holding it at the normal conversion temperature for 30–40 seconds while passing it through a 4" pipe 12 of requisite length. As indicated previously, overall conversion will not be completed during this interval, but less of the enzyme will be destroyed during conversion and sufficient enzyme will remain for completing it during the fermentation period. The pH of the mash at this time should approximate 5.4–5.8 which is controlled by the amount of stillage or other acidic material added to the raw corn mash slurry.

The stream of mash emerging from the conversion pipe is directed through a cooler 13 which continuously reduces its temperature to the normal alcoholic-yeast fermenting temperature range after which it is pumped to the fermenters 14. With a fermenter having 1000 bu. capacity, 965 bu. will be supplied from the system to which 35 bu. of yeast mash is added for inoculation purposes. Fermentation is carried out for 72–96 hrs. during which the temperature may be allowed to rise as high as 89° F. In the fermenters, conversion proceeds to completion.

The reduction in conversion time results in the production of less sugar and in the preservation of more amylase. Nevertheless, the sugar thus produced (60–75%) is amply sufficient to permit the initiation of the fermentation by yeast, while the amylase thus preserved apparently functions, under normal fermentation conditions of pH, temperature, etc., to continue the conversion of the remaining starches and dextrins, and to carry out such conversion to a degree substantially greater than that heretofore obtained. As a result, a more complete conversion and fermentation is made possible. This results in an increased yield of alcohol which appears to be of the magnitude of 0.1 proof gals. per bu. of grain mashed. Additionally, a more uniform fermentation product is obtained.

It will be readily appreciated that the short holding time has the further advantages of enabling the size of the equipment to be considerably reduced, and of reducing the possibility of contamination. The decreased time and increased yield necessarily bring about important operating economies.

Having described our invention, we claim:

1. An improvement in converting a mixture of malt and cooked mash for subsequent fermentation purposes comprising: subjecting the mixture to preliminary conversion by holding it at a normal conversion temperature of about 145° for a period of less than 15 minutes which is sufficient to effect a substantial degree of conversion but insufficient to render ineffective the conversion power of the malt; and then immediately cooling the mixture to the normal alcoholic-yeast fermenting temperature range.

2. An improvement in converting a mixture of malt and cooked mash for subsequent fermentation purposes comprising: subjecting the mixture to preliminary conversion by holding it at a normal conversion temperature of about 145° for a period of less than 15 minutes which is sufficient to effect a substantial degree of conversion but insufficient to render ineffective the conversion power of the malt; and then cooling the mixture to the normal alcoholic-yeast fermenting temperature range with sufficient rapidity substantially to preserve the conversion power of the malt.

3. An improvement in the art of producing a fermentable mash comprising: continuously mixing a malt slurry with a cooked mash to form a stream of malted mash; passing the stream through a conversion zone; subjecting the stream in said zone to preliminary conversion by holding it at a normal conversion temperature of about 145° F. for a period less than 15 minutes which is sufficient to effect a substantial degree of conversion but insufficient to render ineffective the conversion power of the malt; and then immediately cooling the stream to the normal alcoholic-yeast fermenting temperature range.

4. In a method of producing alcohol from a cooked mash wherein the cooked mash is mixed with malt, carbohydrates of the mixture converted and the converted mixture subjected to alcoholic-yeast fermentation, the steps which comprise: maintaining the mixture of malt and cooked mash at a normal conversion temperature of about 145° F. for less than 15 minutes to effect a substantial degree of conversion without rendering ineffective the conversion power of the malt; and then cooling the mixture immediately to the alcoholic-yeast fermenting temperature range to retain the conversion power of the malt.

5. In a method of producing alcohol from a cooked mash wherein the cooked mash is mixed with malt, carbohydrates of the mixture converted and the converted mixture subjected to alcoholic-yeast fermentation, the steps which comprise: maintaining the mixture of malt and cooked mash at a normal conversion temperature of about 145° F. for not substantially more than about 5 minutes, to reduce the consistency of the mixture to a workable value and, at the same time, effect a substantial degree of conversion without rendering ineffective the conversion power of the malt; and then cooling the mixture immediately to the alcoholic-yeast fermenting temperature range to preserve the conversion power of the malt.

6. In a method of producing alcohol from a cooked mash wherein the cooked mash is mixed with malt, carbohydrates of the mixture converted and the converted mixture subjected to alcoholic-yeast fermentation, the steps which comprise: continuously mixing a stream of malt with a stream of the cooked mash; maintaining a stream of the mixture at a normal conversion temperature of about 145° F. for not substantially more than about 5 minutes, to reduce the consistency of the mixture to a workable value and effect a substantial degree of conversion without rendering ineffective the conversion power of the malt; and then cooling the stream immediately to the alcoholic-yeast fermenting temperature range to preserve the conversion power of the malt.

7. In a method of producing alcohol from a cooked mash wherein the cooked mash is mixed with malt, carbohydrates of the mixture converted and the converted material subjected to alcoholic-yeast fermentation, the steps which comprise: continuously mixing malt with the cooked mash to form a stream of malted mash; subjecting the stream to preliminary conversion by holding it at a normal conversion temperature of about 145° F. for a period of less than 15 minutes which is sufficient to effect a substantial degree of conversion but insufficient to reduce the quantity of active amylase to ineffective proportions; cooling the stream to the normal alcoholic-yeast fermenting temperature range with sufficient rapidity to preserve effective proportions of amylase; and subjecting the cooled material to alcoholic-yeast fermentation in the presence of the preserved amylase.

8. In a method of producing alcohol from a cooked mash wherein the cooked mash is mixed with malt, carbohydrates of the mixture converted and the converted material fermented, the steps which comprise: mixing malt with the cooked mash to form malted mash; subjecting the malted mash to preliminary conversion by holding it at a normal conversion temperature of about 145° F. for a period, not substantially exceeding 5 minutes, sufficient to reduce its consistency to a workable value and effect a substantial degree of conversion but insufficient to reduce the quantity of active amylase below effective proportions; and then cooling the mash to a temperature substantially below the normal conversion temperature with sufficient rapidity to preserve effective proportions of active amylase which functions to complete the conversion of the mixture under subnormal conversion temperature conditions.

9. In a method of producing alcohol from a cooked mash wherein the cooked mash is mixed with malt, carbohydrates of the mixture converted and the converted mixture fermented, the steps which comprise: continuously mixing the malt with the cooked mash to form a stream of malted mash; subjecting the stream to preliminary conversion by holding it at a normal conversion temperature of about 145° F. for not substantially more than 5 minutes to produce a workable quantity of fermentable sugar, which is effective to initiate and support subsequent fermentation and to render the mixture free flowing or workable at normal conversion and fermentation temperatures, but insufficient to reduce the quantity of active amylase below effective proportions; cooling the stream to the normal fermenting temperature range with sufficient rapidity to preserve effective proportions of active amylase; and then conducting alcoholic-yeast fermentation of the mixture in the presence of its preserved amylase content which functions to produce more fermentable sugar by conversion.

HARRISON C. BLANKMEYER.
WILLIAM H. STARK.